US006760851B2

(12) United States Patent
Teshima et al.

(10) Patent No.: US 6,760,851 B2
(45) Date of Patent: Jul. 6, 2004

(54) POWER SAVINGS INFORMATION PROCESSING APPARATUS

(75) Inventors: Masao Teshima, Fuchu (JP); Toshiyuki Masaki, Fukaya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 360 days.

(21) Appl. No.: 09/805,120

(22) Filed: Mar. 14, 2001

(65) Prior Publication Data

US 2001/0037470 A1 Nov. 1, 2001

(30) Foreign Application Priority Data

Apr. 28, 2000 (JP) ........................................ 2000-131860

(51) Int. Cl.$^7$ .............................. G06F 1/26; G06F 1/32
(52) U.S. Cl. ........................ 713/320; 713/310; 713/323; 345/158; 345/163
(58) Field of Search ................................. 713/300, 320, 713/310, 323, 324; 345/158, 163

(56) References Cited

U.S. PATENT DOCUMENTS

| | | | | |
|---|---|---|---|---|
| 5,446,906 A | * | 8/1995 | Kardach et al. | 713/300 |
| 5,854,621 A | * | 12/1998 | Junod et al. | 345/158 |
| 5,875,120 A | * | 2/1999 | Matsushima et al. | 713/300 |
| 5,925,110 A | * | 7/1999 | Klein | 710/15 |
| 5,990,868 A | * | 11/1999 | Frederick | 345/158 |
| 6,243,819 B1 | * | 6/2001 | Jung | 713/320 |
| 6,269,449 B1 | * | 7/2001 | Kocis | 713/310 |
| 6,308,278 B1 | * | 10/2001 | Khouli et al. | 713/323 |

FOREIGN PATENT DOCUMENTS

| | | |
|---|---|---|
| JP | 4-28334 | 3/1992 |
| JP | 4-291612 | 10/1992 |
| JP | 5-324139 | 12/1993 |
| JP | 7-105174 | 4/1995 |
| JP | 7-219688 | 8/1995 |
| JP | 9-218726 | 8/1997 |
| JP | 9-282067 | 10/1997 |
| JP | 10-171560 | 6/1998 |
| JP | 10-326126 | 12/1998 |
| JP | 11-39066 | 2/1999 |

OTHER PUBLICATIONS

Decision of Rejection from the Japanese Patent Office for Patent Application No. 2000-131860, Mailing No. 107497, Mailing Date Apr. 1, 2003 and translation (4 pages).

* cited by examiner

*Primary Examiner*—Paul R. Myers
*Assistant Examiner*—Raymond N Phan
(74) *Attorney, Agent, or Firm*—Finnegan, Henderson, Farabow, Garrett & Dunner, L.L.P.

(57) ABSTRACT

A PC includes a main body housing and lid. The main body housing has an input unit on the upper surface, and the lid pivotally attached to the back portion via a hinge. The lid has a liquid crystal display on the inner surface, and an antenna disposed above the display to communicate with a peripheral device. The PC has a detector made up of a push type switch and projection for detecting the open/closed state of the lid. The CPU of the PC detects the open/closed state of the lid by a detection signal from the detector, and controls shift of the peripheral device between a normal mode and a power saving mode.

20 Claims, 4 Drawing Sheets

POWER SAVINGS INFORMATION PROCESSING APPARATUS

CROSS-REFERENCE TO RELATED APPLICATIONS

This application is based upon and claims the benefit of priority from the prior Japanese Patent Application No. 2000-131860, filed Apr. 28, 2000, the entire contents of which are incorporated herein by reference.

BACKGROUND OF THE INVENTION

The present invention relates to an information processing apparatus and system, and power saving method for the system and, more particularly, to a technique of detecting the non-use state of the apparatus main body and switching the operation mode of a peripheral device by radio communication in accordance with the detection result.

As disclosed in Jpn. Pat. Appln. KOKAI Publication No. 9-282067, some of information processing terminals such as a PC (Personal Computer), and some of peripheral devices such as a keyboard and mouse (pointing device for inputting a manipulation quantity) comprise a radio communication function. Such devices are connected by radio, and data are communicated between the connected devices. A wireless information processing apparatus or peripheral device having the radio communication function is free from obstruction of a cable, can be freely installed within a radio communicable distance, and can increase the operability, compared to cable connection between devices.

Many of peripheral devices having the radio communication function are driven by batteries in terms of cable-less operation, and power consumption must be reduced to ensure a longer operation time. However, in communicating data using the radio communication function, the radio communication function consumes large power. For this reason, peripheral devices such as a wireless keyboard and wireless mouse have a power saving mode for reducing power consumption in addition to a normal operation mode.

One of methods of shifting to the power saving mode for reducing power consumption in a conventional information processing apparatus using a wireless keyboard uses time measurement means for starting time measurement operation when key input by the operator stops. If the time measurement means detects the lapse of a predetermined time, power supplies other than one for a circuit necessary for resuming the operation are turned off to reduce consumption of the battery power. As another method, means for shifting the operation mode to the power saving mode in accordance with key input is employed, and the operator key-inputs a predetermined instruction to shift the mode to the power saving mode.

The method of shifting the mode to power saving mode upon detection of the lapse of a predetermined time after key input stops requires a predetermined time till shift to the power saving mode. During the predetermined time, the power consumption state does not change, and power is wastefully consumed. If a book or the like is placed on the wireless keyboard, a key is erroneously operated. In this case, the apparatus cannot stay in the power saving mode, wastefully consuming power. Similarly, if the operation key of a wireless mouse is erroneously pressed, the apparatus cannot stay in the power saving mode, wastefully consuming power.

In the method in which the operator inputs an instruction to shift the operation mode to the power saving mode, when a plurality of devices are to be shifted to the power saving mode, the operation must be repeated for the number of devices to be shifted, which makes the operation very cumbersome. If the operator forgets to perform an operation, these devices remain in the normal mode, and wastefully consume power.

BRIEF SUMMARY OF THE INVENTION

It is an object of the present invention to provide an information processing apparatus and system, and power saving method for the system that can reliably prevent wasteful power consumption.

According to a first aspect of the present invention, there is provided an information processing apparatus comprising:

an information processing section switchable between a first state and a second state in which power consumption is lower than in the first state;

a communication section configured to allow radio communication between the information processing section and a peripheral device, the peripheral device being switchable between a third state and a fourth state in which power consumption is lower than in the third state; and a controller configured to control the peripheral device via the communication section so as to set the peripheral device in the third state when the information processing section is in the first state, and set the peripheral device in the fourth state when the information processing section is in the second state.

According to a second aspect of the present invention, there is provided an information processing system comprising:

an information processing apparatus having an information processing section switchable between a first state and a second state in which power consumption is lower than in the first state;

a peripheral device switchable between a third state and a fourth state in which power consumption is lower than in the third state;

a communication section configured to allow radio communication between the information processing section and the peripheral device; and a controller configured to control the peripheral device via the communication section so as to set the peripheral device to the third state when the information processing section is in the first state, and set the peripheral device to the fourth state when the information processing section is in the second state.

According to a third aspect of the present invention, there is provided a power saving method in an information processing system, comprising the steps of:

switching an information processing section of an information processing apparatus between a first state and a second state in which power consumption is lower than in the first state;

switching a peripheral device between a third state and a fourth state in which power consumption is lower than in the third state, the peripheral device communicating with the information processing section via a communication section by radio; and controlling the peripheral device via the communication section so as to set the peripheral device in the third state when the information processing section is in the first state, and set the peripheral device in the fourth state when the information processing section is in the second state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
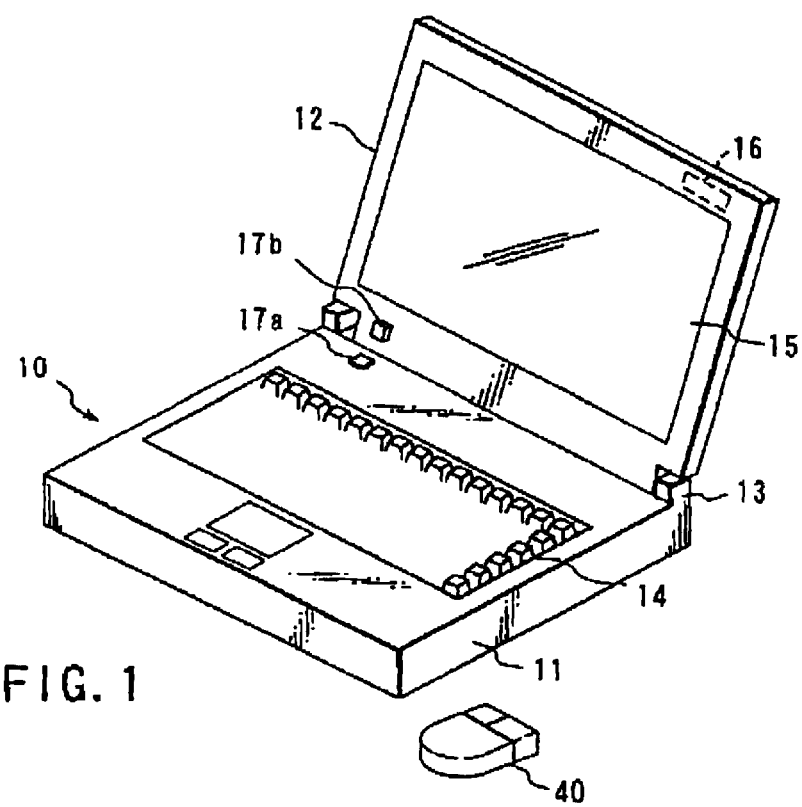
FIG. 1 is a perspective view showing an information processing system having a radio communication function according to the first embodiment of the present invention.

Embodiments of the present invention will be described below with reference to the several views of the accompanying drawing. In the following description, the same reference numerals denote building components having almost the same functions and arrangements, and a repetitive description will be made only when necessary.

(First Embodiment)

FIG. 1 is a perspective view showing an information processing system having a radio communication function according to the first embodiment of the present invention. The system shown in FIG. 1 comprises a notebook type PC (Personal Computer) 10 serving as an information processing apparatus, and a wireless mouse 40 serving as a pointing device for inputting a manipulation quantity to the PC 10. The PC 10 and mouse 40 are constituted to perform radio communication by a radio communication scheme such as Bluetooth.

As shown in FIG. 1, the notebook type PC 10 comprises a main body housing 11 and lid 12. The lid 12 is pivotally attached to the back portion of the main body housing 11 via a hinge 13. The main body housing 11 has an input unit 14 such as a keyboard on the upper surface, and incorporates a circuit board (not shown) which constitutes an information processing section including a CPU (central processing unit) 21 and so forth to be described later.

The lid 12 has on its inner surface a display whose operation is controlled by the CPU 21, e.g., a display 15 such as a liquid crystal display. An antenna 16 for communicating with an external peripheral device is disposed above the display 15. The antenna 16 is connected to a communication controller incorporated in the main body housing via a coaxial cable (not shown). The antenna 16 is not limited to the upper portion of the lid 12, and may be disposed at another portion or on the main body housing 11 side.

The PC 10 has a detector for detecting the open/closed state of the lid 12. This detector is made up of, e.g., a push type switch 17a and projection 17b. The switch 17a is attached at the back portion of the main body housing 11, i.e., near the hinge 13, whereas the projection 17b is attached on the lid 12 side. When the lid 12 is closed, the projection 17b presses the switch 17a to turn on the contact. The switch 17a is connected to the CPU 21 incorporated in the main body housing 11 (to be described in detail later). The CPU 21 detects the open/closed state of the lid 12 by the switch 17a, and controls to shift a peripheral device such as a wireless mouse from a normal mode to a power saving mode in which power consumption is lower, or from the power saving mode to the normal mode.

Figure 2:
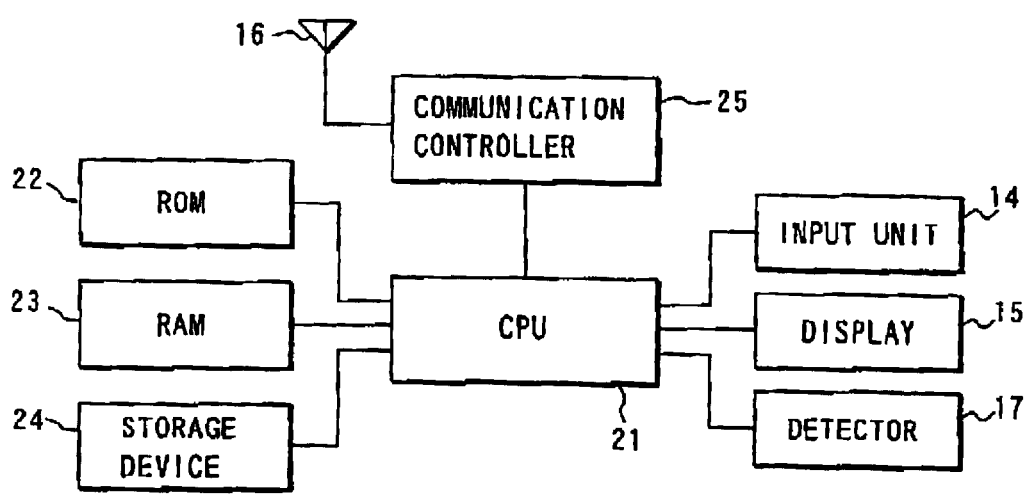
FIG. 2 is a block diagram showing the circuit arrangement of an information processing apparatus used in the information processing system shown in FIG. 1.

FIG. 2 is a block diagram showing the circuit arrangement of the PC 10. As shown in FIG. 2, the CPU 21 is connected to a ROM 22, a RAM 23, a large-capacity storage device 24, the input unit 14, the display 15, a detector 17, and a communication controller 25. The communication controller 25 is connected to the antenna 16 shown in FIG. 1. The information processing section of the PC 10 including the CPU 21 as the main component can switch the operation mode between the normal mode and the power saving mode in which power consumption is lower.

The CPU 21 controls the whole system, and realizes various functions by executing software programs stored in the ROM 22 or storage device 24.

The ROM 22 is a read-only memory device for storing programs for operating the CPU 21 and various initial data. The ROM 22 stores programs for realizing various functions including character input control.

The RAM 23 is a memory device read/write-accessible by the CPU 21. The RAM 23 temporarily saves necessary data along with control operation of the CPU 21. The RAM 23 has a storage portion for setting in advance information of a peripheral device connected to the PC 10 by radio. Settings of device information will be described in detail later.

The storage device 24 is an information storage unit such as a hard disk arranged in addition to the ROM 22 and RAM 23. Software for operating a radio communication function is installed in the storage device 24.

The communication controller 25 communicates with a peripheral device by radio via the antenna 16, and is made up of an RF unit for amplifying a radio signal and converting a frequency, a baseband unit for performing communication processing, and the like.

The input unit 14 is formed from an input device such as a keyboard, and allows inputting various kinds of information. The display 15 is, e.g., a liquid crystal display, and displays various kinds of information.

The detector 17 is made up of the switch 17a and projection 17b shown in FIG. 1, detects the open/closed state of the lid 12, and outputs the detection signal to the CPU 21.

In other words, the detector 17 detects a state representing whether the operator wants to use the information processing section of the PC 10. The CPU 21 controls the operation mode of the power supply of a wireless peripheral device via the communication controller 25 and antenna 16 in accordance with a detection signal from the detector 17.

On the other hand, the mouse 40 constituted as a separate body from the PC 10 uses, e.g., a battery as a power supply. The mouse 40 comprises a power-on/off switch, and has a function, in power-on operation, of switching between the normal mode and the power saving mode, in which power consumption is lower, by radio communication with the PC 10. The PC 10 and mouse 40 communicate with each other by radio. When the operator operates the mouse 40, the information is sent by radio to the PC 10 where processing corresponding to the information is done.

Figure 5:
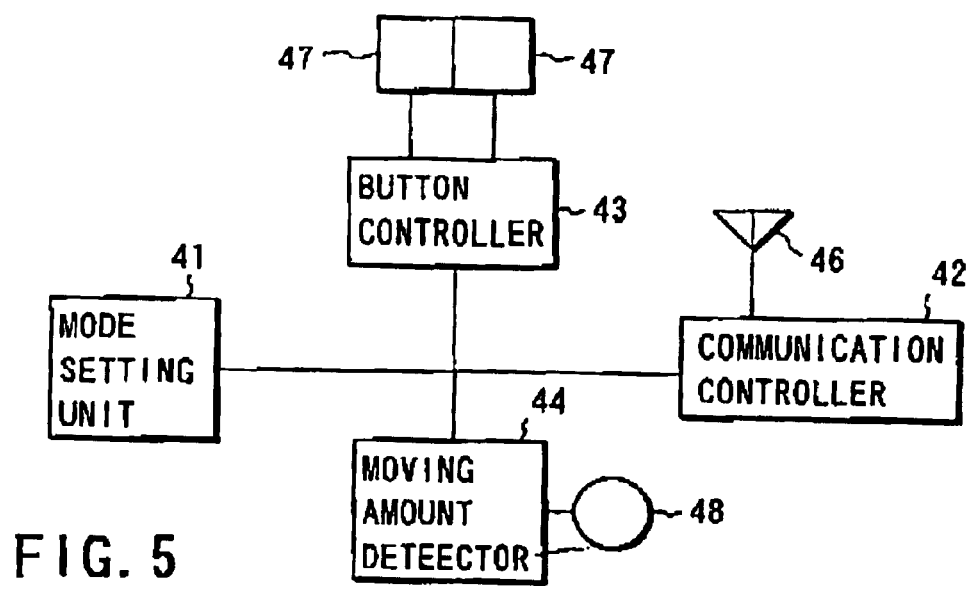
FIG. 5 is a block diagram showing the circuit arrangement of a wireless mouse used in the information processing system shown in FIG. 1.

FIG. 5 is a block diagram showing the circuit arrangement of the mouse 40. The mouse 40 comprises a mode setting unit 41, communication controller 42, button controller 43, and moving amount detector 44 that are connected to each other via a bus. The communication controller 42, button controller 43, and moving amount detector 44 are respectively connected to an antenna 46, operation buttons 47, and a moving amount detection device 48.

The mode setting unit 41 sets the operation mode of the mouse 40 to either of the normal mode and power saving mode on the basis of a radio communication instruction from the PC 10.

The antenna 46 is used to transmit/receive a radio signal to/from the PC 10. The communication controller 42 controls a radio signal transmitted/received via the antenna 46.

The operation buttons 47 are used to input an instruction from the operator to the mouse 40. The button controller 43 detects the operation and operation contents of the operation buttons 47.

The moving amount detection device 48 is formed from a ball rotation mechanism for detecting a manipulation quantity applied to the mouse by the operator. The moving amount detector 44 detects a manipulation quantity (moving distance) to the moving amount detection device 48.

The operation of the information processing system shown in FIG. 1 will be explained.

Figure 3:
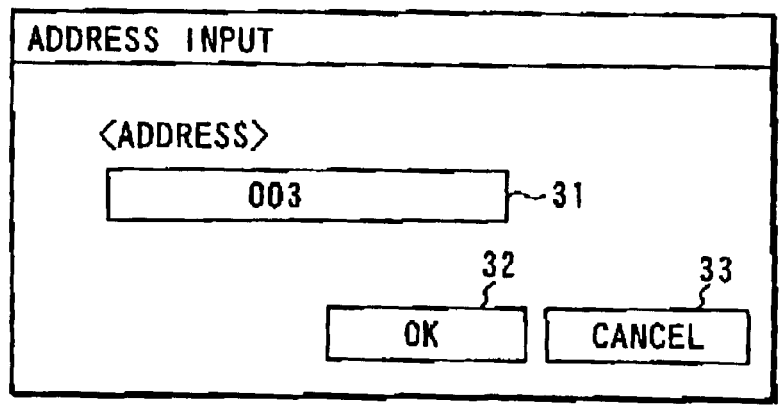
FIG. 3 is a view showing a display window example when a peripheral device to be shifted to a power saving mode is set in the apparatus shown in FIGS. 1 and 2.

A peripheral device, e.g., the mouse 40 to be shifted to the power saving mode when the use of the PC 10 is interrupted, is set as follows. For example, if a power saving device setting mode is selected by key operation from a menu window, a setting window shown in FIG. 3 is displayed. This setting window displays a device address input frame 31, OK button 32, and cancel button 33.

A device address is input to the device address input frame 31 on this setting window. If necessary, a device name of a mouse, keyboard, or the like is input, and then the OK button 32 is clicked with the mouse or the like. When the OK button 32 is clicked, the input device address is stored in the RAM 23 (or storage device 24). In this manner, the address is set for a peripheral device to be shifted to the power saving mode.

Figure 4:
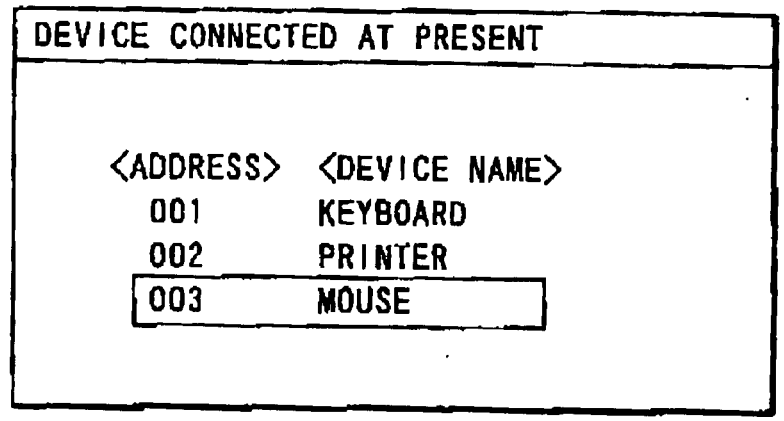
FIG. 4 is a view showing a window display example when a list of addresses of devices connected by radio channels at present is displayed in the apparatus shown in FIGS. 1 and 2.

FIG. 4 is a view showing a window display example when a list of addresses of devices connected by radio channels at present is displayed. In this case, the address of a device to be shifted to the power saving mode, i.e., the address of a device set in FIG. 3 is inversely displayed among device addresses displayed on the window so as to easily discriminate the device from unset devices. In this example, the addresses of a "keyboard", "printer", and "mouse" are displayed as the addresses of devices connected by radio channels at present, and the address of the "mouse" is inversely displayed as a device to be shifted to the power saving mode. The "printer" is generally shared by a plurality of PCs, driven by an AC power supply, and thus is not set as a device to be shifted to the power saving mode in this example.

When the operator folds the lid 12 having the display 15, i.e., closes the lid 12 in order to interrupt the operation, the detector 17 detects that the lid 12 is closed, and sends the detection signal to the CPU 21. The CPU 21 switches the operation mode of the information processing section of the PC 10 from the normal mode to the power saving mode on the basis of this detection signal.

Upon receiving the detection signal from the detector 17, the CPU 21 checks device setting information stored in the RAM 23. The CPU 21 transmits an instruction for shifting the normal mode to the power saving mode to the mouse 40 via the communication controller 25 and antenna 16 in accordance with the setting information. The mouse 40 receives the instruction transmitted from the PC 10 via the antenna 46 and communication controller 42, and the mode setting unit 41 switches the operation mode of the mouse 40 from the normal mode to the power saving mode in accordance with the instruction.

Even if the operator operates the wireless mouse 40 while the lid 12 is closed, the mouse 40 remains in the power saving mode. Thus, even if the operator erroneously operates the mouse 40, the mouse 40 and PC 10 do not shift to the normal mode, and remain in the power saving mode, which can prevent wasteful power consumption.

When the operator opens the lid 12 in order to resume the use of the PC 10, the detector 17 detects that the lid 12 is open, and sends the detection signal to the CPU 21. The CPU 21 switches the operation mode of the information processing section of the PC 10 from the power saving mode to the normal mode on the basis of the detection signal. The CPU 21 transmits an instruction for shifting the power saving mode to the normal mode to the wireless mouse 40 via the communication controller 25 and antenna 16. The mouse 40 receives the instruction transmitted from the PC 10 via the antenna 46 and communication controller 42, and the mode setting unit 41 switches the operation mode of the mouse 40 from the power saving mode to the normal mode in accordance with the instruction.

Figure 6:
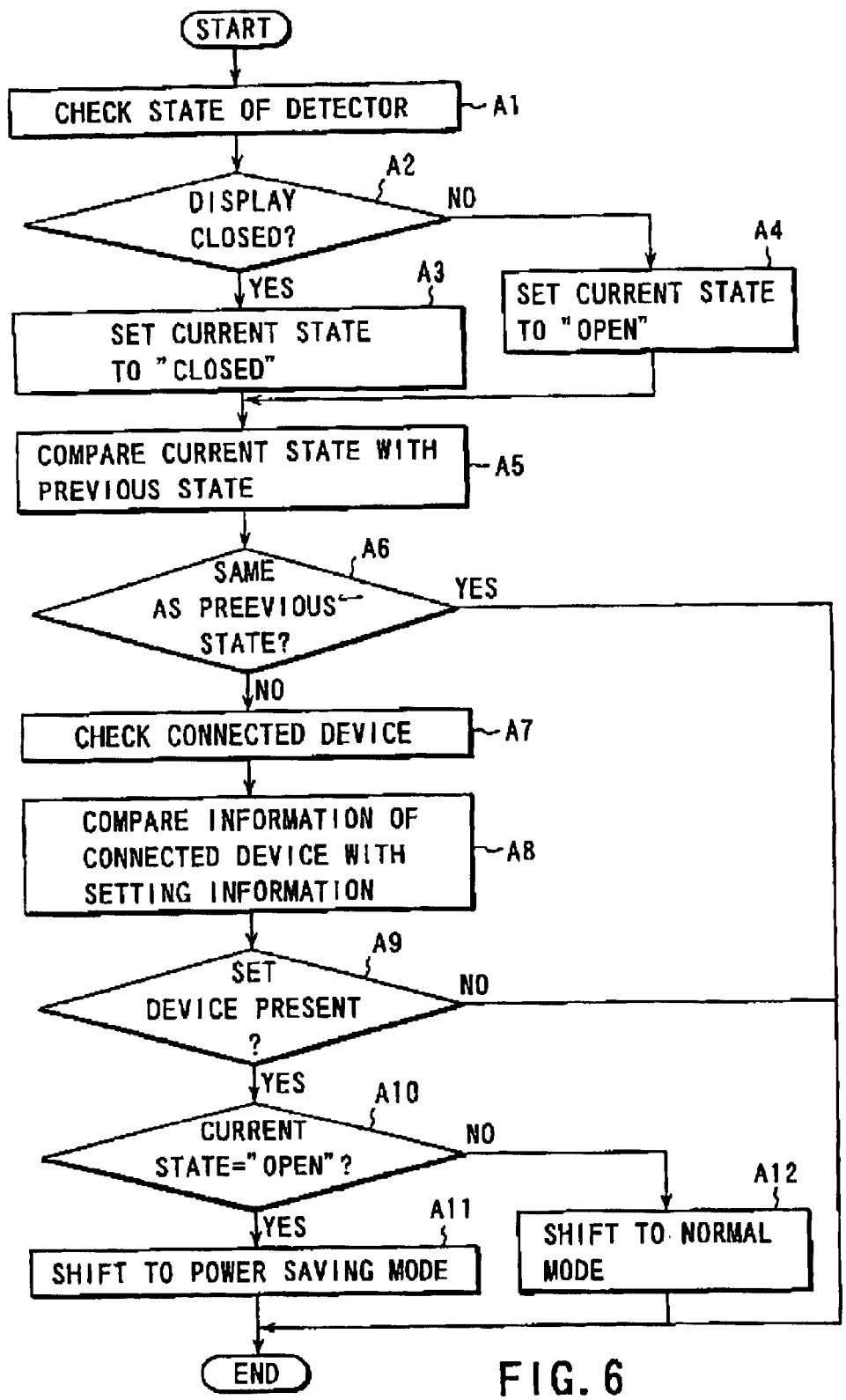
FIG. 6 is a flow chart showing control operation for a peripheral device in the system shown in FIG. 1.

Mode control of the mouse 40 by the CPU 21 of the PC 10 will be explained in detail with reference to the flow chart shown in FIG. 6.

The CPU 21 checks a signal from the detector 17 (step A1), and determines whether the lid 12, i.e., display 15 is closed or open at present (step A2). If the CPU 21 determines that the display 15 is closed, it sets the current state to "closed" (step A3); or if the CPU 21 determines that the display 15 is open, it sets the current state to "open" (step A4).

The CPU 21 compares the current state set in step A3 or A4 with the previously set state (step A5), and determines whether the current state is the same as the previous state (step A6). If YES in step A6, the processing ends; or if NO, the CPU 21 checks peripheral devices connected by radio channels at present, and acquires the device information, i.e., information such as addresses for identifying connected devices (step A7).

The CPU 21 refers to setting information of a device to be shifted to the power saving mode when the use of the PC 10 is interrupted, which information is set in the RAM 23 in advance, compares the setting information with the information of devices connected at present (step A8), and determines whether the devices connected at present include the set device (A9). If YES in step A9, the CPU 21 checks the current state of the detector 17 set in step A3 or A4 (step A10).

If the current state of the detector 17 is "closed", the CPU 21 transmits an instruction for shifting the normal mode to the power saving mode to the set device, e.g., the wireless mouse 40 in this example, and shifts the device from the normal mode to the power saving mode (step A11). If the current state of the detector 17 is "open", the CPU 21 transmits an instruction for shifting the power saving mode to the normal mode to the set device, and shifts the device from the power saving mode to the normal mode (step A12).

Then, shift control of the peripheral device to the power saving mode or normal mode ends.

(Second Embodiment)

Figure 7:
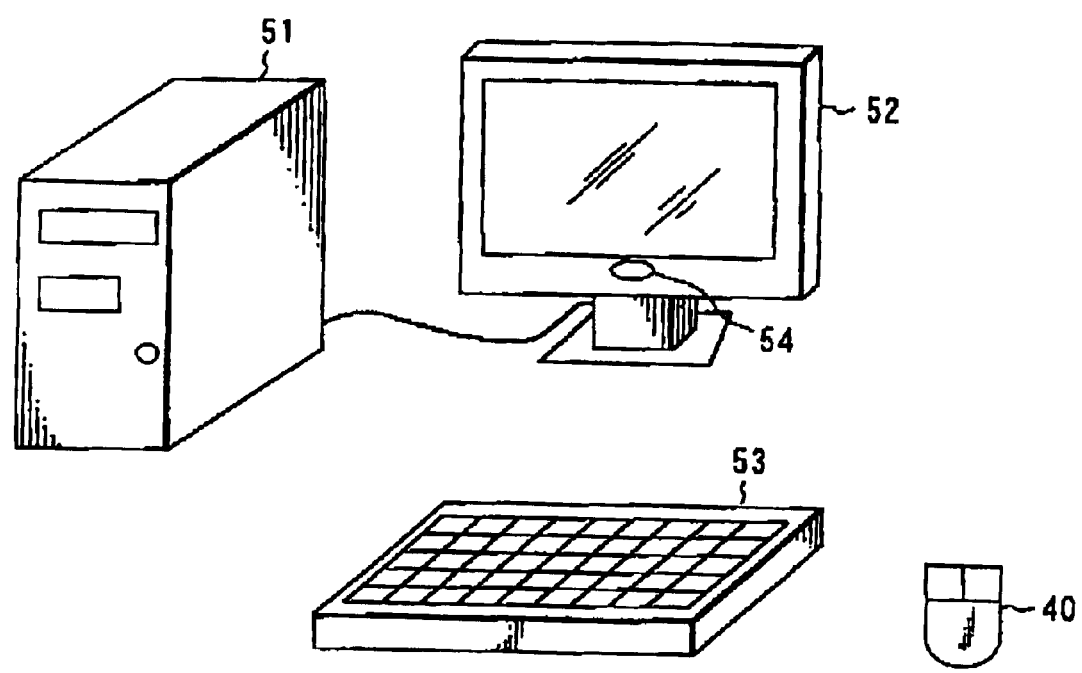
FIG. 7 is a perspective view showing an information processing system having a radio communication function according to the second embodiment of the present invention.

FIG. 7 is a perspective view showing an information processing system having a radio communication function according to the second embodiment of the present invention.

In the second embodiment, the present invention is applied to a desktop type PC. As shown in FIG. 7, this information processing system includes a desktop type PC main body 51 which incorporates a CPU and comprises a communication antenna (not shown) for a peripheral device. The PC main body 51 is connected to a display 52 whose operation is controlled by the CPU. The information processing section of the desktop type PC having the CPU as the component can switch the operation mode between a normal mode and a power saving mode in which power consumption is lower.

The system further includes a wireless mouse 40 and wireless keyboard 53 as wireless peripheral devices. The mouse 40 and keyboard 53 communicate with the PC main body 51 by radio to transmit/receive data. That is, when the operator operates the mouse 40 or keyboard 53, information corresponding to the operation is transmitted by radio to the PC main body 51 where processing corresponding to the input information is executed.

In the second embodiment, a detector 54 formed from an optical sensor such as an infrared sensor is attached on the front surface of the screen of the display 52 as means for detecting a state which represents whether the operator wants to use the information processing section of the PC. The detector 54 senses the front-side position of the display 52, detects whether the operator is near the PC, and outputs the detection information to the PC main body 51. The PC main body 51 sends a mode control instruction to the mouse 40 and keyboard 53 in accordance with the detection information of the detector 54. In the second embodiment, similar to the first embodiment, the addresses of devices to be shifted to the power saving mode, e.g., the mouse 40 and keyboard 53 in this case are set in a memory in advance.

In the second embodiment having this arrangement, when the operator moves away from the display 52 in order to interrupt the operation of the PC, the detector 54 detects that the operator has moved away, and sends the detection signal to the PC main body 51. Upon reception of the detection signal, the CPU of the PC main body 51 switches the operation mode of the information processing section of the PC from the normal mode to the power saving mode on the basis of the detection signal. The CPU transmits an instruction for shifting the normal mode to the power saving mode to devices set to shift to the power saving mode in advance, i.e., the mouse 40 and keyboard 53 among devices connected by radio. The mouse 40 and keyboard 53 shift to the power saving mode after receiving the instruction from the PC main body 51.

If the detector 54 detects that the operator comes close to the display 52, the CPU of the PC main body 51 switches the operation mode of the information processing section of the PC from the power saving mode to the normal mode. The CPU outputs an instruction for switching to the normal mode to peripheral devices, and returns the devices set in the power saving mode to the normal mode.

As described in detail above, according to the first and second embodiments, when the operator interrupts the operation of the apparatus main body, this state can be detected to shift peripheral devices to the power saving mode, thereby reliably preventing wasteful power consumption. The operation mode can be switched for peripheral devices set in storage means, i.e., target peripheral devices, which can improve the operability.

In the first embodiment, even if the operator operates a peripheral device such as a wireless mouse while the lid is kept closed, the PC and peripheral device remain in the power saving mode. Thus, even if the operator erroneously operates a peripheral device, the peripheral device does not shift to the normal mode and remains in the power saving mode, which can prevent wasteful power consumption. In the second embodiment, even if a PC does not comprise any opening/closing lid, like a desktop type PC, the presence/absence of the operator can be detected to reliably switch the operation mode of a peripheral device, thus preventing wasteful power consumption.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
    an information processing section switchable between a first state and a second state in which power consumption is lower than in the first state;
    a communication section configured to allow radio communication between the information processing section and a peripheral device, the peripheral device being switchable between a third state and a fourth state in which power consumption is lower than in the third state, and the information processing section being prevented from shifting from the second state to the first state by an input from the peripheral device in the fourth state; and
    a controller configured to control the peripheral device via the communication section so as to set the peripheral device in the third state when the information processing section is in the first state, and set the peripheral device in the fourth state when the information processing section is in the second state.

2. The apparatus according to claim 1, wherein the apparatus further comprises a detector configured to detect a state which represents whether the information processing section is in either of the first and second states, and
    the controller controls the peripheral device on the basis of detection by the detector.

3. The apparatus according to claim 1, wherein the Information processing section is set to switch an operation mode between a normal mode and a power saving mode in which power consumption is lower than in the normal mode in correspondence with the first and second states.

4. The apparatus according to claim 1, further comprising a selector configured to select in advance a device to be switched between the third and fourth states as the peripheral device among a plurality of peripheral devices which communicate with the information processing section by radio via the communication section.

5. The apparatus according to claim 1, wherein
the apparatus further comprises a detector configured to detect a state which represents whether an operator wants to use the information processing section, and
the controller controls the peripheral device on the basis of detection by the detector.

6. The apparatus according to claim 5, wherein
the apparatus further comprises a main body housing which houses the information processing section, and a lid connected to the main body housing to be opened and closed, and
the detector detects an open/closed state of the lid as the state which represents whether the operator wants to use the information processing section.

7. The apparatus according to claim 6, further comprising a display which is supported by the lid and whose operation is controlled by the information processing section.

8. The apparatus according to claim 5, wherein the apparatus further comprises a display whose operation is controlled by the information processing section, and
the detector detects whether the operator is close to the display as the state which represents whether the operator wants to use the information processing section.

9. The apparatus according to claim 8, wherein the detector comprises an optical sensor configure to sense a front-side position of the display.

10. An information processing system comprising:
an information processing apparatus having an information processing section switchable between a first state and a second state in which power consumption is lower than in the first state;
a peripheral device switchable between a third state and a fourth state in which power consumption is lower than in the third state;
a communication section configured to allow radio communication between the information processing section and the peripheral device, the information processing section being prevented from shifting from the second state to the first state by an input from the peripheral device in the fourth state; and
a controller configured to control the peripheral device via the communication section so as to set the peripheral device to the third state when the information processing section is in the first state, and set the peripheral device to the fourth state when the information processing section is in the second state.

11. The system according to claim 10, further comprising a plurality of peripheral devices which communicate with the information processing section by radio via the communication section, and a selector configured to select in advance a device controlled to be switched between the third and fourth states as the peripheral device among the plurality of peripheral devices.

12. The system according to claim 10, wherein
the apparatus comprises a main body housing which houses the information processing section, a lid connected to the main body housing to be opened and closed, and a detector configured to detect an open/closed state of the lid as a state which represents whether an operator wants to use the information processing section, and
the controller controls the peripheral device on the basis of detection by the detector.

13. The system according to claim 10, wherein
the apparatus comprises a display whose operation is controlled by the information processing section, and a detector configured to detect whether an operator is close to the display as a state which represents whether the operator wants to use the information processing section, and
the controller controls the peripheral device on the basis of detection by the detector.

14. The system according to claim 10, wherein the peripheral device comprises a pointing device configured to input a manipulation quantity to the information processing section.

15. The system according to claim 10, wherein the peripheral device comprises a keyboard configured to send an input instruction to the information processing section.

16. An information processing apparatus comprising:
an information processing section switchable between a first state and a second state in which power consumption is lower than in the first state;
a communication section configured to allow radio communication between the information processing section and a peripheral device, the peripheral device being switchable between a third state and a fourth state in which power consumption is lower than in the third state;
a selector configured to select a device to be switched between the third and fourth states as the peripheral device among a plurality of peripheral devices which communicate with the information processing section by radio via the communication section; and
a controller configured to control the peripheral device via the communication section so as to set the peripheral device in the third state when the information processing section is in the first state, and set the peripheral device in the fourth state when the information processing section is in the second state.

17. The apparatus according to claim 16, wherein the apparatus further comprises a detector configured to detect a state which represents whether the information processing section is in either of the first and second states, and the controller controls the peripheral device on the basis of detection by the detector.

18. The apparatus according to claim 16, wherein the information processing section is set to switch an operation mode between a normal mode and a power saving mode in which power consumption is lower than in the normal mode in correspondence with the first and second states.

19. The apparatus according to claim 16, wherein the apparatus further comprises a detector configured to detect a state which represents whether an operator wants to use the information processing section, and the controller controls the peripheral device on the basis of detection by the detector.

20. An information processing system comprising:

an information processing apparatus having an information processing section switchable between a first state and a second state in which power consumption is lower than in the first state;

a plurality of peripheral devices switchable between a third state and a fourth state in which power consumption is lower than in the third state;

a communication section configured to allow radio communication between the information processing section and the plurality of peripheral devices;

a selector configured to select in advance a device controlled to be switched between the third and the fourth states as the peripheral device among the plurality of peripheral devices; and a controller configured to control the peripheral device via the communication section so as to set the peripheral device to the third state when the information processing section is in the first state, and set the peripheral device to the fourth state when the information processing section is in the second state.

* * * * *